RADIO RECEIVER WITH NOISE BLANKING

Filed Dec. 29, 1958 2 Sheets-Sheet 1

INVENTOR.
Weldon Vlasak
BY Mueller & Aichele
Attys.

RADIO RECEIVER WITH NOISE BLANKING

Filed Dec. 29, 1958

2 Sheets-Sheet 2

INVENTOR.
Weldon Vlasak
BY Mueller & Aichele

Attys.

United States Patent Office 3,014,127
Patented Dec. 19, 1961

3,014,127

RADIO RECEIVER WITH NOISE BLANKING

Weldon Vlasak, Fort Lauderdale, Fla., assignor to Motorola, Inc., Chicago, Ill., a corporation of Illinois Filed Dec. 29, 1958, Ser. No. 783,363
13 Claims. (Cl. 250—20)

This invention relates to radio receivers and more particularly to noise cancellation circuits for use in such receivers.

In many types of radio receivers impulse noise can seriously impair signal reception. This is particularly true of mobile communication equipment where, for example, ignition interference and the like, which may be generated by nearby vehicles as well as the vehicle in which the receiver is used, can be coupled into a highly sensitive receiver to appear as undesirable audio output. The co-pending application Serial No. 641,790, filed February 19, 1957, in the name of Roy A. Richardson et al., assigned to the assignee of the present invention, and now Patent No. 2,901,601, dated August 25, 1959, describes and claims a noise blanker which detects noise pulses in an early stage of the receiver, for example, immediately after first conversion in a relatively low gain and low selectivity image rejecting portion of the receiver, and removes the effects of the noise pulses by reducing signal conduction of the receiver at a point therein prior to the highly selective, high gain portion of the receiver which provides the adjacent channel selectivity. This system is particularly effective since the impulse noise signals are cancelled before reaching the narrow band filter of the receiver where the pulses could excite this filter with relatively high energy thus causing ringing, or increase in the pulse duration, and spurious audible output of the receiver.

In a noise cancelling circuit operating in the radio frequency section of a receiver, however, it is important to prevent intermodulation feedthrough of adjacent channel signals which would degrade receiver performance. The intermodulation problem would be quite troublesome in receivers of the type which receive a plurality of closely spaced channels containing signals of widely differing amplitudes. In fact, a noise cancelling circuit of the above described type should respond only to undesired impulse type noise and should be effectively unresponsive to other signal components, of relatively non-impulse type, applied thereto from the receiver.

It is an object of the present invention to provide an improved impulse noise cancelling system for a radio receiver which system has but a minimum of adverse effect of the receiver performance characteristics.

Another object is to provide a radio receiver with a circuit which is responsive to noise signals for cancelling the same in the receiver and which is unresponsive to modulation components of received signals so that these are not introduced into the receiver through the cancelling circuit.

Another object is to provide a noise cancellation circuit which is sensitive to repetitive, sharp, transient pulses and insensitive to other types of relatively steady state signal components.

A feature of the invention is the provision of a radio receiver with a noise pulse cancellation circuit which includes filter means and pulse modifying means for effectively isolating the noise cancellation circuit and rejecting signal modulation components coupled to the cancelling circuit which otherwise could be translated through this circuit.

A further feature is the provision of such a noise cancellation circuit which includes means to reject the modulation components of received signals and pulse duration lengthening means to reshape detected noise pulses for effective noise blanking of a receiver.

Another feature is the provision of a noise cancellation circuit using a multivibrator which is triggered by a detected noise pulse to provide a pulse signal of proper wave form for noise cancelling purposes.

A still further feature of the invention is the provision of a noise signal detector and cancellation circuit using pulse wave shaping means and filter means for isolating the circuit from signals applied to the circuit and for developing stable blanking signals for the receiver.

Further objects, features and the attending advantages of the invention will be apparent upon consideration of the following description taken in conjunction with the accompanying drawings in which.

In brief the invention provides a noise cancellation system for a receiver which detects noise pulses and cancels them in the relatively wide band radio frequency portion of the receiver before the received signal reaches the narrow band adjacent channel selectivity and high gain section of the receiver. Detected noise pulses are passed through a high pass filter which preferably rejects signals in a frequency range up to the band width of the intermediate band, or first IF portion of the receiver, thus rejecting modulation components of received signals. This high pass filter particularly rejects intermodulation components of desired signals and some adjacent channel signals falling within the overall receiver pass band. The filtered pulse is then of a duration which is too short for complete cancellation of the noise pulse as it is translated by the receiver, so this filtered pulse is lengthened in duration and used to gate a signal translating electron discharge device in the receiver. To increase the duration of the cancelling pulse and reduce the spurious signal transfer through the noise cancelling circuit the detected pulse may be used to trigger a multivibrator which produces an output pulse of proper rise time and duration for effective cancellation. The detected pulse may also be lengthened by a diode-capacitor circuit which is relatively stable with supply voltage changes and can operate at relatively high pulse repetition rates. With this latter circuit form the cancelling pulse may be passed through a low pass filter for rejecting signal components such as adjacent channel signals which fall in the receiver bandwidth up to this point, and are translated by the high pass filter, thus increasing the spurious signal isolation characteristic of the noise cancelling circuit.

Figure 1:
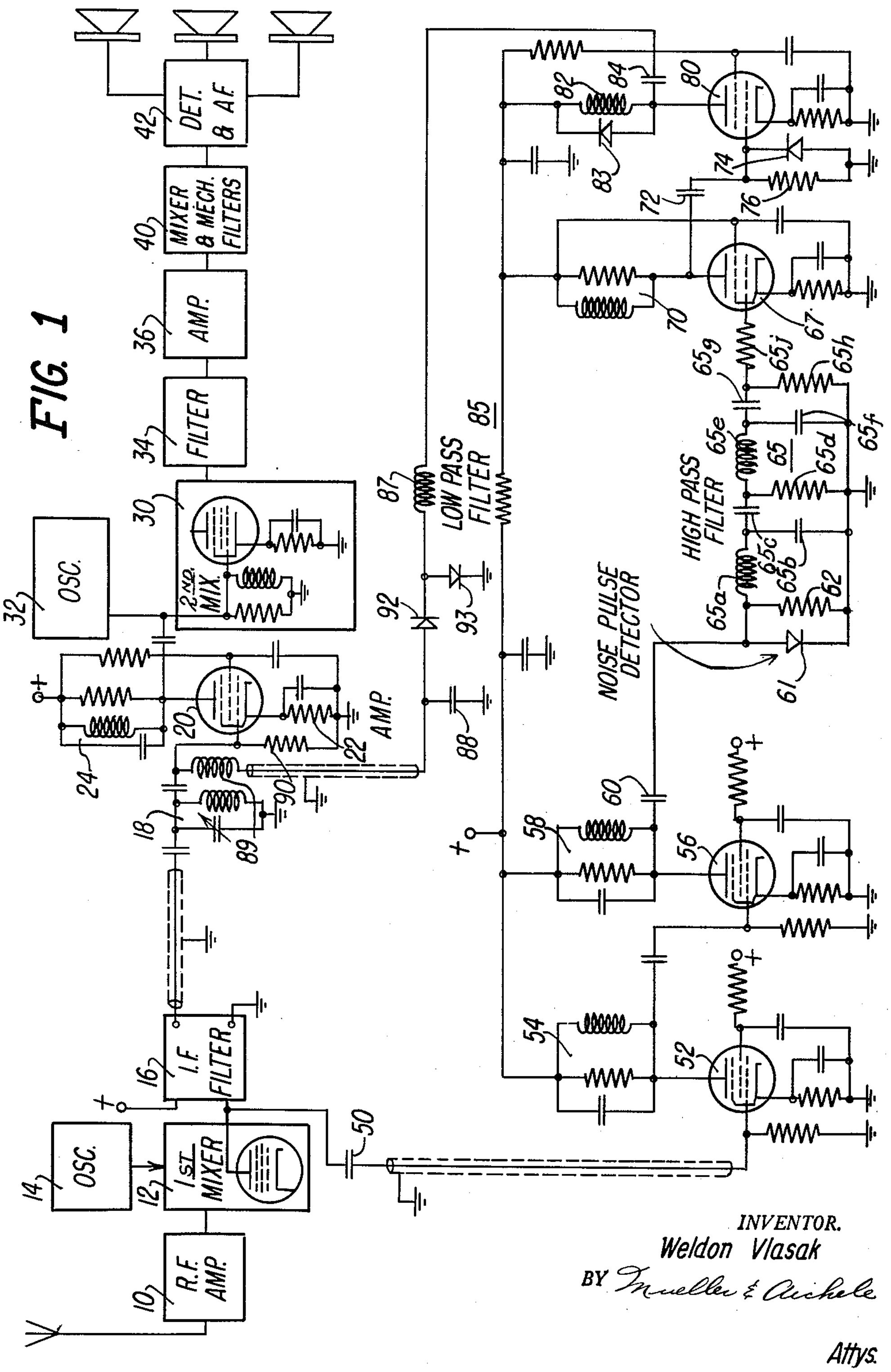
FIG. 1 is a diagram of one form of the invention.

The receiver of FIG. 1 as shown is designed for the reception of a signal having a plurality of modulated subcarriers, each of which may be of a different signal strength. Although it will be apparent that the noise cancellation circuit of the present invention is useful in receivers of other types, a receiver which utilizes a plurality of closely spaced subchannels with a common carrier presents the problems of intermodulation in the noise cancellation circuit in a way to make the improvement more apparent as it is realized in the practice of the present invention.

The received signal is applied to the radio frequency amplifier 10 and from there to a first mixer stage 12 to which is also coupled a signal from oscillator 14. After first conversion the signal is coupled to a filter 16 which also includes a D.C. path to supply an operating potential to the tube mixer 12. The signal is further applied across a tuned circuit 18 and to the control grid of an intermediate frequency amplifier tube 20. Bias for tube 20 is developed across the cathode resistor 22 and the output signal is developed in a damped tuned circuit 24 in the anode circuit of the tube. Tube 20 is preferably of the pentode type and includes the usual screen resistor and bypass.

The signal, still at the first IF frequency, is now applied to a second mixer 30 to which is also coupled a signal from the local oscillator 32. In the mixer 30 the signal is converted to one of still lower frequency and in this state it is applied to a filter 34. It is contemplated that the adjacent channel selectivity of the receiver be provided by the filter 34 and that the various stages preceding this filter be of comparatively low gain to minimize the possibility of intermodulation. These stages preceding filter 34 are essentially to provide image rejection and enough amplification of the signal to maintain it above the receiver noise level.

The desired signal selected by the filter 34 is now applied to a relatively high gain amplifier 36 and from there to a further mixer and filter circuit 40. The circuit 40 is used to convert the various subchannels of the composite signal to signals of very low frequency so that these may be individually selected by means of mechanical filters. Each of the subchannels so selected may then be applied to a detector and audio-amplifier system 42 which will provide demodulation and amplification of these subchannels. The various signals may then be applied to respective utilization devices such as loud speakers.

As previously explained various types of noise pulses, such as ignition noise in mobile equipment, must be prevented from exciting the highly selective filter 34 since such pulses are generally of short duration and high amplitude and would cause excitation or ringing of the filter and production of spurious signals of longer duration in the output of the receiver. To cancel these pulses a portion of the signal including the pulses is derived from the first mixer 12 and applied back to the control grid of the amplifier tube 20 as a negative going cancellation pulse. This effectively places a "hole" in the signal where the noise pulse would otherwise appear. However, the so-called hole may be largely filled in as the signal is translated through the high Q filter 34 so that actually there is no objectionable loss of the desired signal. Furthermore, when cancellation occurs at an early point in the receiver, such as at amplifier tube 20, the noise pulses are of sufficiently short duration that interruption of the desired signal for that brief period does not detract appreciably from the information of the desired signal.

Since there may be some time delay in the noise pulse detection circuit it is contemplated that the filter 16 will include elements providing time delay of the desired signal together with the accompanying noise pulses such that this time delay together with that provided by a tuned circuit 18 will just equal the time delay of the noise pulses as they are translated through the detection circuit and applied to the control grid of tube 20. It has been found that a filter such as filter 16 may require one or two tuned circuits to furnish the desired time delay. It will be understood, of course, that the filter 16 and the tuned circuit 18 are comparatively wide band tuning so that the noise pulses translated through these networks will not be undesirably lengthened in duration.

A portion of the output signal from the first mixer 12 is applied through a capacitor 50 to the control grid of an amplifier tube 52. Tube 52 is a pentode amplifier operating at the frequency of the signal after first conversion. The output from tube 52 is developed across the damped tuned circuit 54 and applied to a second amplifier tube 56 which further amplifies the desired signal and accompanying noise pulses. The output signal from amplifier tube 56 is developed across a damped tuned circuit 58 and applied through capacitor 60 to the parallel combination of diode 61 and diode load resistor 62. Elements 60, 61, and 62 provide pulse detection so that the detected noise pulses together with other components of the signal appear across resistor 62. Poor detection efficiency of diode 61 at low signal levels provides rejection of low level signals so that a certain signal level must be exceeded before intermodulation can occur in the detector circuit. The signal so detected is then coupled through a high pass filter 65 to the control grid of amplifier tube 67. The high pass filter 65 rejects frequencies in the range of intermodulation components which may be produced by the signals of the various subchannels in the composite signal utilized by the receiver. Accordingly, it is preferable that the filter 65 pass only frequencies higher than the band pass range of filter 16. Therefore, it may be seen that if one of the subchannels is very much stronger than another and that this strong subchannel tends to drive amplifier 56 into non-linear operation, the intermodulation products of that signal together with one of the further subchannels, will be rejected in the filter 65 so that the noise blanker system is relatively immune to spurious signal components of this type. By having filter 65 cut off the range below the band pass of filter 16, intermodulation of even the most widely spaced subchannels of the desired signal will be rejected.

The detected signal, comprising essentially the higher frequency components of the noise pulses, is applied to the control grid of tube 67 with negative going polarity to be amplified and developed across the load impedance 70 in the anode circuit of this tube. The pulse is then applied through the capacitor 72 to the control grid of tube 80. The pulses are developed across the resistor 76 connected between the control grid of tube 80 and ground and this resistor is shunted by a diode 74 which keeps the control grid from going negative and restores the noise pulses to a fixed axis. This also gives greater pulse amplitude. Capacitor 72 and resistor 76 further attenuate low frequencies.

The noise pulses so developed across resistor 76 are applied to the control grid of the amplifier tube 80 as positive going noise signals. Tube 80 is connected as an amplifier with its output developed across inductor 82. The inductor 82 (together with the plate to cathode capacitance) is chosen to "ring" in response to the applied noise pulses, but this element is shunted by a diode 83 to prevent this ringing for more than one-half cycle. Greater pulse amplitude is obtained in this manner. Therefore the output signal available at the anode of tube 80 is a relatively narrow, negative going noise pulse and this is applied through a coupling capacitor 84 to a low pass filter 85.

It may be appreciated that the detected noise pulses available at the output of amplifier tube 80 will be of decreased time duration due to the action of filter 65. While the amplitude of the pulses is increased in both amplifier tubes 67 and 80 and the pulse duration is increased somewhat by the ringing circuit 82, 83, it is necessary to further stretch or increase the time duration of the pulses for proper noise cancellation in the receiver. This is done in the low pass filter 85 in conjunction with diodes 92 and 93.

The low pass filter 85 includes a series inductor 87 and a shunt capacitor 88, a series RF choke 89, and the grid return resistor 90. The elements 87–90 form a low pass network which passes the signal frequencies up to the lower cutoff frequency of high pass filter 65. Therefore by the combination of filters 65 and 85 a very high degree of signal isolation is obtained in the translation characteristics of the noise pulse detection system.

Inductor 89 forms a choke to prevent shunting of the desired signal at the grid of tube 20. Diode 92 is connected between the inductors 87 and 89 and the diode 93 is coupled across the pulse path from the junction of inductor 87 and diode 92. Inductor 87, diodes 92 and 93 and capacitor 88 form a network to develop a negative going pulse of increased duration. These diodes are poled to permit charge of capacitor 88, and prevent discharge thereof. Capacitor 88 then discharges through grid resistor 90. As is shown in FIG. 1, inductor 89 is D.C. coupled to the control grid of amplifier tube 20 to which is also applied, as has been mentioned, the desired signal together with the accompanying noise pulses. The detected noise pulse applied through inductor 89 is negative going to cause reduced conduction of tube 20 thus effectively blanking this stage during the occurrence of the pulse. Obviously the cancelling noise signal and the desired signal with undesired noise, do not have to be applied to the same element of an electron discharge device in order to effect noise cancellation.

In a system of practical construction the components in the circuit of FIG. 1 had values as follows:

| | | |
|---|---|---|
| Capacitor 60 | mmfd | 50 |
| Diode 61 | | 1N432 |
| Resistor 62 | megohms | 1 |
| Inductor 65*a* | mh | 3 |
| Capacitor 65*b* | mmfd | 30 |
| Capacitor 65*c* | mmfd | 91 |
| Resistor 65*d* | ohms | 10,000 |
| Inductor 65*e* | mh | 10 |
| Capacitor 65*f* | mmfd | 10 |
| Capacitor 65*g* | mmfd | 27 |
| Resistors 65*h* and 65*j* | ohms | 30,000 |
| Capacitor 72 | mmfd | 18 |
| Resistor 76 | ohms | 51,000 |
| Diode 74 | | 1N432 |
| Inductor 82 | mh | 3 |
| Diode 83 | | 1N432 |
| Capacitor 84 | mfd | .01 |
| Inductor 87 | mh | 10 |
| Capacitor 88 | mmfd | 270 |
| Inductor 89 | mh | 10 |
| Resistor 90 | ohms | 500,000 |
| Diode 92 | | 1N432 |
| Diode 93 | | 1N303 |

Figure 2:
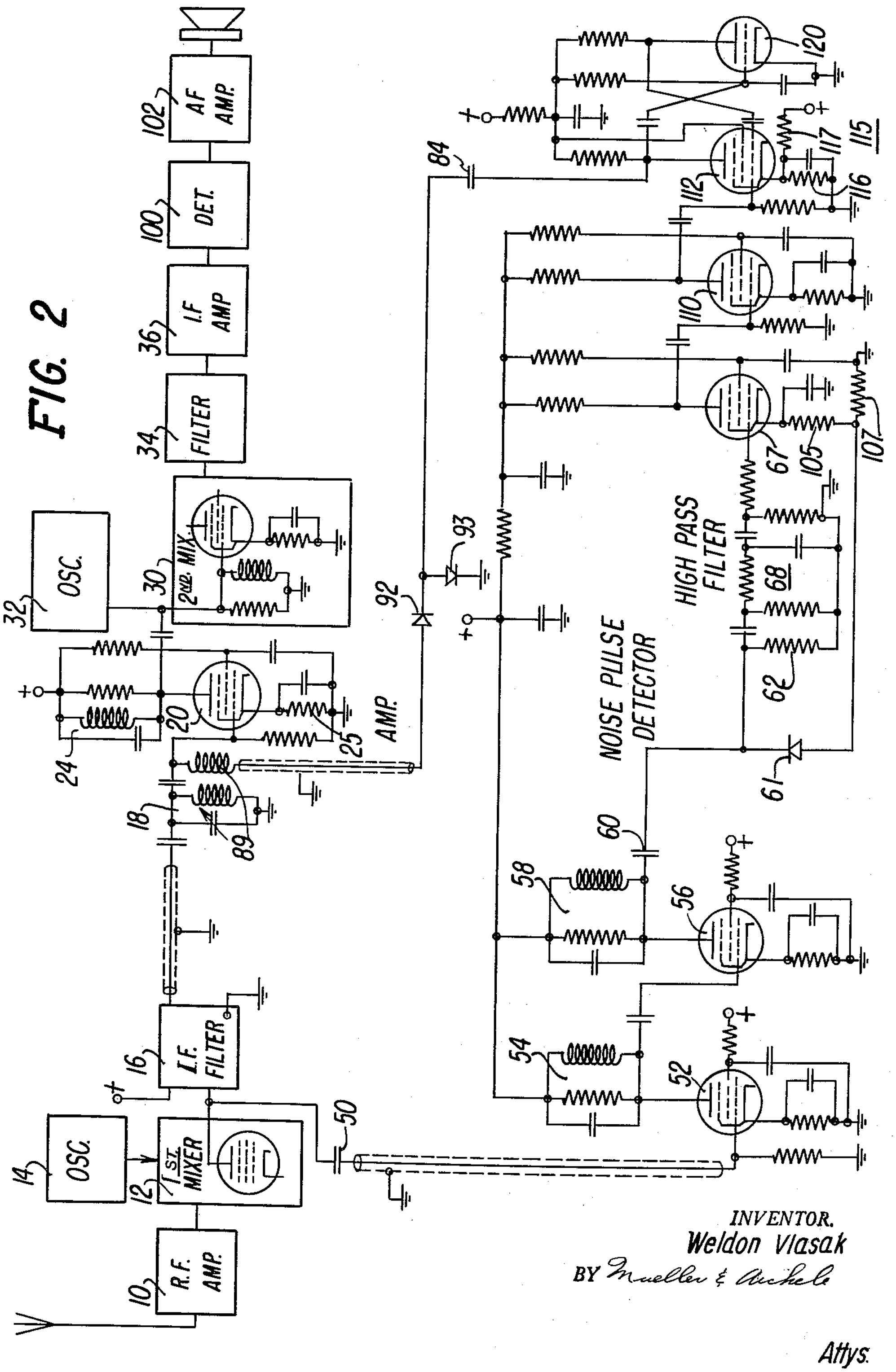
FIG. 2 is a diagram of a further form of the invention.

In the circuit of FIG. 2 the components which correspond to those of the circuit of FIG. 1 are given the same reference characters. In this receiver it is contemplated that the received signal be modulated with only one set of modulation components. Accordingly, the detector 100 and the audio amplifier 102 differ from the corresponding circuits of FIG. 1. However, it should be apparent that the particular type of signal received by the receiver is not necessarily determinative of the success in the use of any particular form of the invention.

In the form of FIG. 2 the circuit for detecting the noise pulses includes a slight positive bias for the detector diode 61. This is accomplished by connecting the junction of the cathode resistors 105 and 107 for the amplifier tube 67 in series with the diode 61 and its load resistor 62. The polarity of this delay voltage is such as to maintain conduction of the diode to aid the detection of pulses.

The high pass filter 68 is connected between the diode load resistor 62 and the control grid of the amplifier tube 67. As in the previous circuit this high pass filter is designed to reject frequency components in the audio or demodulation range and the lower cutoff frequency of this filter should be as high or higher than the frequency of the band pass of filter 16.

Detected pulses applied to tube 67 are amplified thereby and applied to further amplifier tube 110, the output of which is a positive going pulse. This pulse is applied to the control grid of a pentode 112 in the multivibrator circuit 115. This is a so-called one-shot multivibrator with tube 112 normally biased off by means of a positive voltage from voltage divider 116, 117 in the cathode circuit thereof. The triode tube 120 also in the multivibrator circuit is normally conductive. When a positive going noise pulse from the amplifier tube 110 is applied to tube 112, this tube 112 is conductive and tube 120 is cut off to apply a negative going pulse through coupling capacitor 84, diode 92 and choke 89 to the control grid of amplifier tube 20. This will cause reduction in the conduction of tube 20 and blanking of the noise pulse applied thereto through filter 16.

The elements of the multivibrator 115 are selected so that when triggered, the tube 112 remains conductive and tube 120 remains nonconductive for a time of the order of 50 to 100 microseconds, or even less. After this the multivibrator returns to its normal state with tube 112 cut off and tube 120 conductive. An output pulse produced thereby and of this duration is of the proper form for cancellation of most pulse type noise which is encountered in the early stages of a receiver such as amplifier 20. It may be noted that desirable isolation of the noise detection circuit is provided by the multivibrator circuit which essentially develops the noise cancellation pulse in response to a trigger signal which is a detected noise pulse.

The invention provides therefore an improved impulse noise blanker which has but minimum effect on the intermodulation rejection characteristics of a communication type receiver. The system operates in a way to remain responsive to rapidly recurring pulses but yet relatively unresponsive to signal components other than pulse type signals. Furthermore the entire system operates in a portion of a receiver such that the interruption of a desired signal is minimized and even rendered negligible.

I claim:

1. In a superheterodyne receiver including a first portion for translating a modulated radio frequency signal which may be accompanied by noise pulses, said first portion including a band pass filter effectively determining the bandwidth of said first portion, and a second portion following said first portion for repeating the radio frequency signal, and in which the second portion is adapted to be rendered inoperative to repeat the radio frequency signal in response to control pulses applied thereto, a noise silencer system for the receiver including a pulse detector connected to the first portion of the receiver for deriving therefrom the noise pulses, high pass filter means coupled to said pulse detector for rejecting intermodulation components resulting from the interaction of the radio frequency signal with other signal components which may be translated by said pulse detector, said high pass filter means passing those frequencies above the pass band range of the receiver as determined by the band pass filter in the first portion of the receiver, said high pass filter means thereby developing from the noise pulses intermediate pulses of durations substantially shorter than those of the noise pulses, means for increasing the time duration of the intermediate pulses to produce control pulses, and means applying the control pulses to the second portion of the receiver to interrupt the second portion of the receiver.

2. In a superheterodyne receiver including a first portion of comparatively low gain for translating a modulated radio frequency signal which may be accompanied by noise pulses and for providing image rejection in the receiver, and a second portion of comparatively high gain following said first portion for repeating the radio frequency signal and providing adjacent channel selectivity in the receiver, and in which the second portion is adapted to be rendered inoperative to repeat the radio frequency signal in response to control pulses applied thereto, a noise silencer system for the receiver including an amplifier connected to the first portion of the receiver for increasing the level of the signal and noise pulses, a pulse detector coupled to said amplifier for deriving the noise pulses, high pass filter means coupled to said pulse detector for rejecting intermodulation components and spurious signals falling within the pass band range of the first portion of the receiver thereby developing from the noise pulses intermediate pulses having durations short with respect to the noise pulses, means for increasing the time duration of the intermediate pulses to produce control pulses, and means including a further amplifier for applying the control pulses to the second portion of the receiver to interrupt the second portion of the receiver.

3. In a superheterodyne receiver including a first portion for translating a modulated radio frequency signal which may be accompanied by noise pulses, said first portion including a band pass filter effectively determining the bandwidth of said first portion and a second portion following said first portion for repeating the radio frequency signal, and in which the second portion is adapted to be rendered inoperative to repeat the radio frequency signal in response to control pulses applied thereto, a noise silencer system for the receiver including a pulse detector connected to the first portion of the receiver for deriving therefrom the noise pulses, filter means coupled to said pulse detector for rejecting intermodulation components resulting from the interaction of the radio frequency signal with signals of other channels which may be translated by said pulse detector, said high pass filter means passing only those frequencies above the pass band range of the receiver as determined by the band pass filter in the first portion thereof, said high pass filter means thereby developing from the noise pulses intermediate pulses of reduced time durations, multi-vibrator circuit means for producing control pulses of increased duration in response to the intermediate pulses of reduced time duration, and means applying the control pulses to the second portion of the receiver to interrupt the second portion of the receiver.

4. A radio receiver with an impulse noise silencer, including in combination, a first portion having first filter means to determine therein a relatively wide bandwidth for translating a received radio frequency signal which may be accompanied by noise pulses, a second portion having a relatively narrow bandwidth for translating the radio frequency signal translated by said first portion, said first filter means further providing a time delay for the radio frequency signal and the noise pulses and having an input coupled to said first portion and further having an output, an electron valve coupled between said output and said second portion and adapted to reduce the level of signals translated thereby in response to control pulses applied thereto, noise pulse amplifier and detector means coupled to the input of said first filter means for producing detected pulses in response to the noise pulses, second filter means for the detected pulses having a high pass characteristic to reject intermodulation signal components falling in the bandwidth of said first filter means, and pulse duration lengthening means controlled by the detected pulses from said second filter means for applying control pulses to said electron valve as control pulses therefor.

5. A multiple conversion superheterodyne radio receiver with an impulse noise silencer, including in combination, a first portion having relatively wide bandwidth for translating a received radio frequency signal which may be accompanied by noise pulses and including a first mixer, a second portion having a relatively narrow bandwidth for translating the radio frequency signal translated by said first portion and including a second mixer, first filter means providing a time delay for the radio frequency signal and the noise pulses and having an input coupled to said first mixer and further having an output, an electron valve coupled between said output and said second mixer and adapted to reduce the level of signals translated thereby in response to control pulses applied thereto, noise pulse amplifier and detector means coupled to the input of said first filter means for producing detected pulses in response to the noise pulses, second filter means for the detected pulses having a high pass characteristic to reject frequencies in the bandwidth of said first filter means, and pulse modifying means controlled by the detected pulses from said second filter means for developing pulses of a duration of less than 100 microseconds and applying such pulses to said electron valve as control pulses therefor.

6. A radio receiver adapted to receive simultaneously a plurality of signals spaced in a given frequency range, including in combination, a first receiver portion having relatively wide bandwidth for translating the plurality of signals which may be accompanied by noise pulses, a second receiver portion having a relatively narrow bandwidth for translating the signals translated by said first portion, first filter means providing a time delay for the signals and the noise pulses and having an input coupled to said first receiver portion and further having an output, an electron valve coupled between said output and said second receiver portion and adapted to reduce the level of signals translated thereby in response to control pulses applied thereto, noise pulse amplifier and detector means coupled to the input of said first filter means for producing detected pulses in response to the noise pulses, second filter means for the detected pulses having a high pass characteristic with a low frequency cut off above the band pass range of the bandwidth of said first filter means, and pulse duration lengthening means and low pass filter means controlled by the detected pulses from said second filter means for applying control pulses to said electron valve as control pulses therefor.

7. A radio receiver with an impulse noise silencer, including in combination, a first portion having relatively wide bandwidth for translating a received radio frequency signal which may be accompanied by noise pulses, a second portion having a relatively narrow bandwidth for translating the radio frequency signal translated by said first portion, first filter means providing a time delay for the radio frequency signal and the noise pulses and having an input coupled to said first portion and further having an output, an electron valve coupled between said output and said second portion and adapted to reduce the level of signals translated thereby in response to control pulses applied thereto, noise pulse detector means coupled to the input of said first filter means for producing detected pulses in response to the noise pulses, second filter means for the detected pulses having a high pass characteristic to reject modulation frequency components of the received signal, and a one shot multivibrator circuit controlled by the detected pulses from said second filter means for applying control pulses of given duration to said electron valve as control pulses therefor.

8. A radio receiver with an impulse noise silencer, including in combination, a first portion having relatively wide bandwidth for translating a received radio frequency signal which may be accompanied by noise pulses, a second portion having a relatively narrow bandwidth for translating the radio frequency signal translated by said first portion, first filter means providing a time delay for the radio frequency signal and the noise pulses and having an input coupled to said first portion and further having an output, an electron valve coupled between said output and said second portion and adapted to reduce the level of signals translated thereby in response to control pulses applied thereto, noise pulse detector means coupled to the input of said first filter means for producing detected pulses in response to the noise pulses, second filter means for the detected pulses having a high pass characteristic with a low frequency cut off above the band pass range of the bandwidth of said first filter means, pulse duration lengthening means controlled by the detected pulses from said second filter means, and third filter means having a low pass characteristic with a high frequency cut off below the low frequency cut off of said second filter means for applying the control pulses from said pulse duration lengthening means to said electron valve as control pulses therefor.

9. The combination of claim 8 in which said pulse duration lengthening means comprises inductor-capacitor means and diode means forming a fast charge, slow discharge ringing network with a selected time constant for wave shaping the detected pulses from said second filter means.

10. The combination of claim 9 in which said third filter means includes diode means poled to limit to one polarity the control pulses applied by said third filter means to said electron valve.

11. In a superheterodyne receiver including a first portion of comparatively low gain for translating a modulated radio frequency signal which may be accompanied by noise pulses and for providing image rejection in the receiver, and a second portion of comparatively high gain following said first portion for repeating the radio frequency signal and providing adjacent channel selectivity in the receiver, and in which the second portion is adapted to be rendered inoperative to repeat the radio frequency signal in response to control pulses applied thereto, a noise silencer system for the receiver including an amplifier connected to the first portion of the receiver for increasing the level of the signal and noise pulses, a pulse detector coupled to said amplifier for deriving the noise pulses, high pass filter means coupled to said pulse detector for rejecting modulation components of the radio frequency signal which may be translated by said pulse detector thereby to develop from the noise pulses intermediate pulses of durations reduced with respect to the noise pulses, means for increasing the time duration of the intermediate pulses to produce control pulses, and means, including low pass filter means for rejecting adjacent channel components in the range of said high pass filter means, for applying the control pulses to the second portion of the receiver to interrupt the second portion of the receiver.

12. A multiple conversion superheterodyne radio receiver with an impulse noise silencer, including in combination, a first portion having relatively wide bandwidth for translating a received radio frequency signal which may be accompanied by noise pulses and including a first mixer, a second portion having a relatively narrow bandwidth for translating the radio frequency signal translated by said first portion and including a second mixer, first band pass filter means providing a time delay for the radio frequency signal and the noise pulses and having an input coupled to said first mixer and further having an output, an electron valve coupled between said output and said second mixer and adapted to reduce the level of signals translated thereby in response to control pulses applied thereto, noise pulse amplifier and detector means coupled to the input of said first filter means for producing detected pulses in response to the noise pulses, second filter means for the detected pulses having a high pass characteristic to reject frequencies in the bandwidth of said first filter means, and pulse modifying means controlled by the detected pulses from said second filter means for developing pulses of a duration of less than 100 microseconds are rejecting frequencies passed by said second filter means for applying such pulses to said electron valve as control pulses therefor.

13. The combination of claim 8 in which said pulse duration lengthening means includes a half-cycle ringing circuit comprising inductor and capacitor means shunted by a diode for wave shaping of the detected pulses.

References Cited in the file of this patent

UNITED STATES PATENTS

| | | |
|---|---|---|
| 2,438,501 | Hings | Mar. 30, 1948 |
| 2,901,601 | Richardson et al. | Aug. 25, 1959 |
| 2,905,816 | Buebel | Sept. 22, 1959 |

FOREIGN PATENTS

| | | |
|---|---|---|
| 197,077 | Great Britain | May 10, 1923 |